(12) United States Patent
Hanumalagutti et al.

(10) Patent No.: US 10,135,319 B2
(45) Date of Patent: Nov. 20, 2018

(54) ELECTRIC MACHINE FOR VEHICLE

(71) Applicant: Ford Global Technologies, LLC, Dearborn, MI (US)

(72) Inventors: Prasad Dev Hanumalagutti, Dearborn, MI (US); Michael W. Degner, Novi, MI (US); Franco Leonardi, Dearborn Heights, MI (US); Edward Chan-Jiun Jih, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 15/072,703

(22) Filed: Mar. 17, 2016

(65) Prior Publication Data

US 2017/0271955 A1    Sep. 21, 2017

(51) Int. Cl.
| | |
|---|---|
| *H02K 9/19* | (2006.01) |
| *B60K 1/00* | (2006.01) |
| *H02K 1/20* | (2006.01) |
| *H02K 1/22* | (2006.01) |
| *H02K 5/20* | (2006.01) |

(52) U.S. Cl.
CPC ............... *H02K 9/19* (2013.01); *B60K 1/00* (2013.01); *H02K 1/20* (2013.01); *H02K 1/22* (2013.01); *H02K 5/20* (2013.01); *B60K 2001/006* (2013.01)

(58) Field of Classification Search
CPC ............ H02K 9/19; H02K 9/197; H02K 1/20; H02K 3/24
See application file for complete search history.

(56) References Cited

U.S. PATENT DOCUMENTS

| | | | | |
|---|---|---|---|---|
| 2,975,309 | A  * | 3/1961 | Seidner | H02K 9/197 |
| | | | | 174/DIG. 20 |
| 3,995,181 | A  * | 11/1976 | Suit | H02K 3/24 |
| | | | | 165/104.19 |
| 4,413,201 | A | 11/1983 | Nikitin et al. | |
| 5,845,389 | A | 12/1998 | Roberts et al. | |
| 6,211,587 | B1 | 4/2001 | Enomoto et al. | |
| 6,300,693 | B1 | 10/2001 | Poag et al. | |
| 6,407,474 | B1 | 6/2002 | Mahn et al. | |
| 6,452,294 | B1 | 9/2002 | Vandervort et al. | |
| 6,727,611 | B2 | 4/2004 | Bostwick | |
| 6,787,950 | B2 | 9/2004 | Heim | |
| 6,856,053 | B2 | 2/2005 | LeFlem et al. | |
| 6,954,010 | B2 * | 10/2005 | Rippel | H02K 1/20 |
| | | | | 310/216.014 |
| 7,157,818 | B2 | 1/2007 | Jones | |
| 7,538,457 | B2 | 5/2009 | Holmes et al. | |
| 7,566,999 | B2 | 7/2009 | Neal | |
| 7,692,356 | B2 | 4/2010 | Bolt et al. | |
| 7,768,166 | B2 | 8/2010 | Lafontaine et al. | |
| 7,928,348 | B2 | 4/2011 | Neal | |
| 7,952,240 | B2 | 5/2011 | Takenaka et al. | |

(Continued)

*Primary Examiner* — Dang Le
(74) *Attorney, Agent, or Firm* — David B. Kelley; Brooks Kushman P.C.

(57) ABSTRACT

A vehicle electric machine includes a stator having an end face and a yoke region defining a channel. End windings are adjacent to the end face. An annular cover has inner and outer walls defining an annular cavity configured to receive the end windings. The channel opens into the cavity, and a radial distance between the inner and outer walls is less than or equal to a radial length of the end face.

20 Claims, 8 Drawing Sheets

(56) References Cited

U.S. PATENT DOCUMENTS

| | | |
|---|---|---|
| 8,080,908 B2 | 12/2011 | Matsubara et al. |
| 8,080,909 B2 | 12/2011 | Perkins |
| 8,138,640 B2 | 3/2012 | Urano et al. |
| 8,405,262 B1 | 3/2013 | Beatty et al. |
| 8,766,497 B2 | 7/2014 | Goto et al. |
| 8,963,384 B2 | 2/2015 | Kirkley, Jr. et al. |
| 2008/0042498 A1 | 2/2008 | Beer |
| 2008/0042502 A1 | 2/2008 | VanLuik et al. |
| 2008/0143203 A1 | 6/2008 | Purvines et al. |
| 2010/0045125 A1 | 2/2010 | Takenaka et al. |
| 2011/0215660 A1 | 9/2011 | Goto et al. |
| 2012/0032543 A1 | 2/2012 | Chakraborty et al. |
| 2012/0062056 A1 | 3/2012 | Bradfield |
| 2012/0091838 A1 | 4/2012 | Miyamoto et al. |
| 2012/0242178 A1 | 9/2012 | Miyamoto et al. |
| 2013/0342049 A1 | 12/2013 | Stridsberg |
| 2014/0265663 A1 | 9/2014 | Chamberlin et al. |
| 2014/0265670 A1 | 9/2014 | Chamberlin et al. |
| 2014/0354090 A1 | 12/2014 | Chamberlin |
| 2015/0217632 A1* | 8/2015 | Lebeau .................. B60K 6/26 192/110 B |
| 2015/0280525 A1 | 10/2015 | Rippel et al. |
| 2015/0280526 A1 | 10/2015 | Chamberlin et al. |
| 2017/0025911 A1 | 1/2017 | Jewell et al. |

\* cited by examiner

ELECTRIC MACHINE FOR VEHICLE

TECHNICAL FIELD

The present disclosure relates to electric machines, for use with electric and hybrid-electric vehicles, that are capable of acting either as a motor or as a generator.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment, a vehicle electric machine includes a stator having an end face and a yoke region defining a channel. End windings are adjacent to the end face. An annular cover has inner and outer walls defining an annular cavity configured to receive the end windings. The channel opens into the cavity, and a radial distance between the inner and outer walls is less than or equal to a radial length of the end face.

According to another embodiment, a vehicle electric machine includes a stator core having an inner surface defining slots, an outer surface, opposing first and second end faces, and a yoke region defining a channel extending between the first and second end faces. The channel has a first port defined by the first end face and a second port defined by the second end face. Windings of the stator are configured to extend through the slots and have end windings adjacent the end faces. A rotor is disposed within a cavity defined by the inner surface. The electric machine also includes first and second annular covers each having an outer circumferential wall and an inner circumferential wall cooperating to define an annular cooling cavity configured to receive one of the end windings. A radial distance between the inner and outer walls is less than or equal to a radial distance between the inner and outer surfaces. The first port opens into the cavity of the first cover and the second port opens into the cavity of the second cover to fluidly connect the annular cooling cavities.

According to yet another embodiment, a vehicle electric machine includes a stator having inner and outer surfaces, and an end face extending therebetween. Windings extend through slots defined by the inner surface. An annular cover has inner and outer circumferential walls defining a cavity configured to receive a portion of the windings. A radial distance between the inner and outer walls is less than or equal to a radial length of the end face.

According to a further embodiment, a drivetrain of a vehicle includes an electric machine disposed within a transmission housing. The electric machine includes a stator having inner and outer surfaces and an end face extending therebetween. Windings extend through slots defined by the inner surface. An annular cover has inner and outer walls defining a cavity configured to receive a portion of the windings. A radial distance between the inner and outer walls is less than a radial length of the end face.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
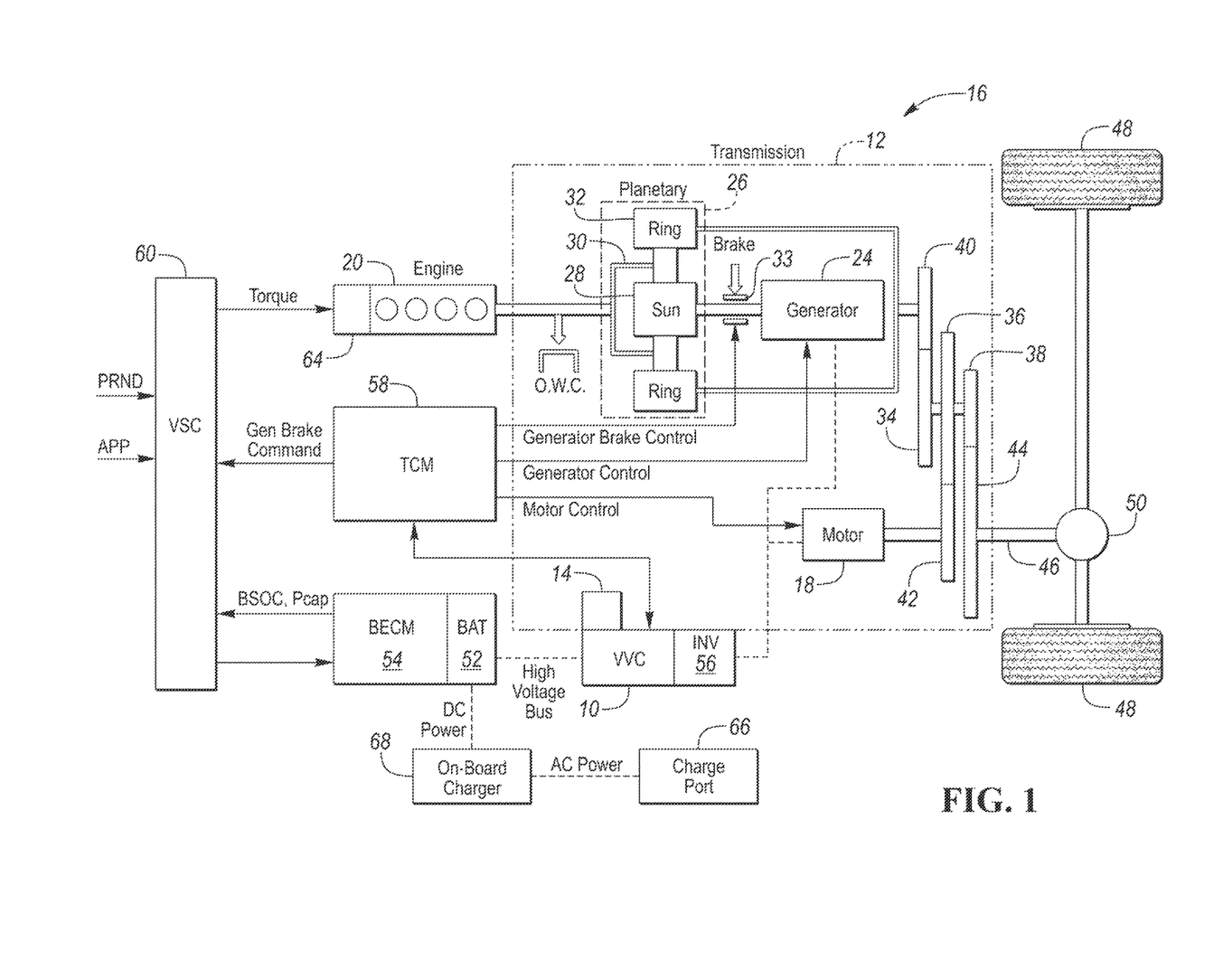
FIG. 1 is a schematic diagram of an example hybrid vehicle.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
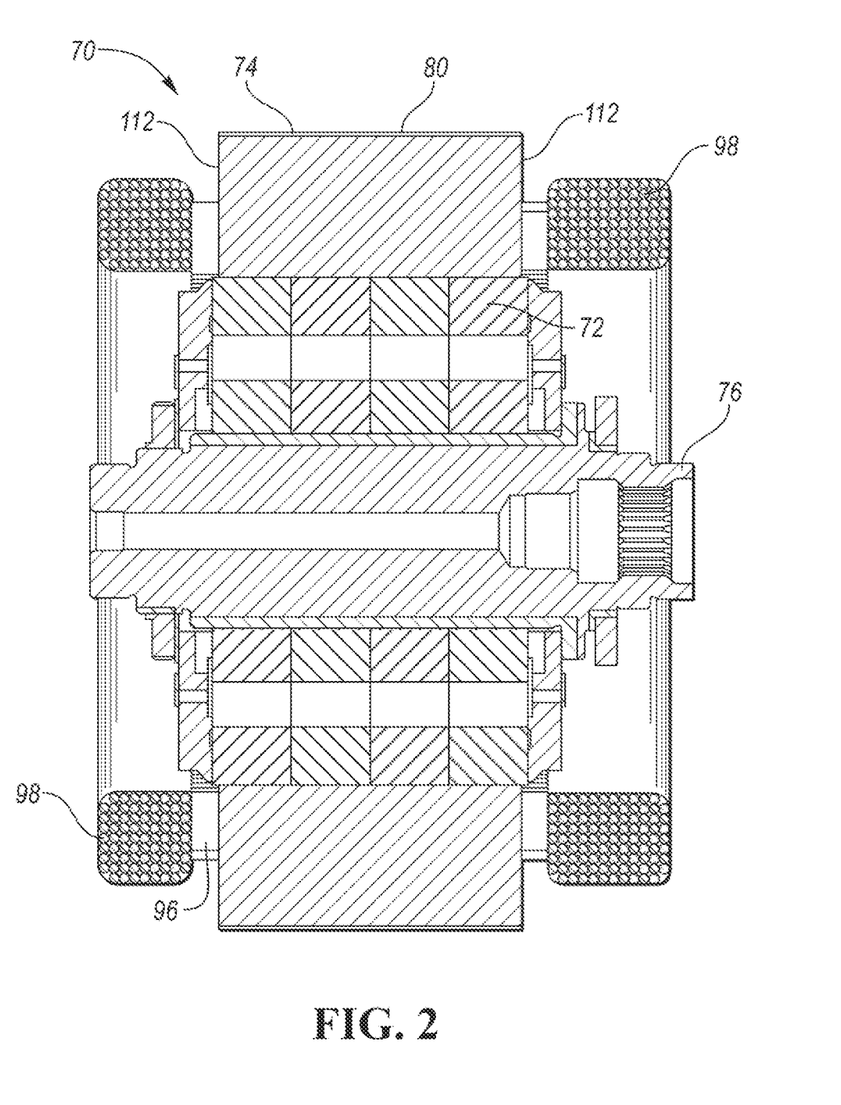
FIG. 2 is side view, in cross section, of a portion of an example electric machine.
Figure 3:
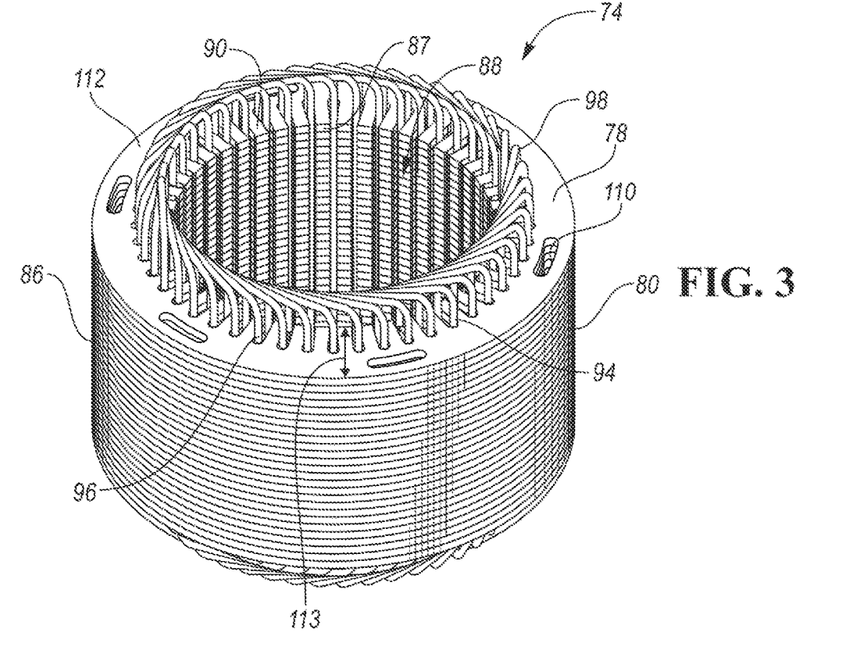
FIG. 3 is a perspective view of a stator of an electric machine.
Figure 4:
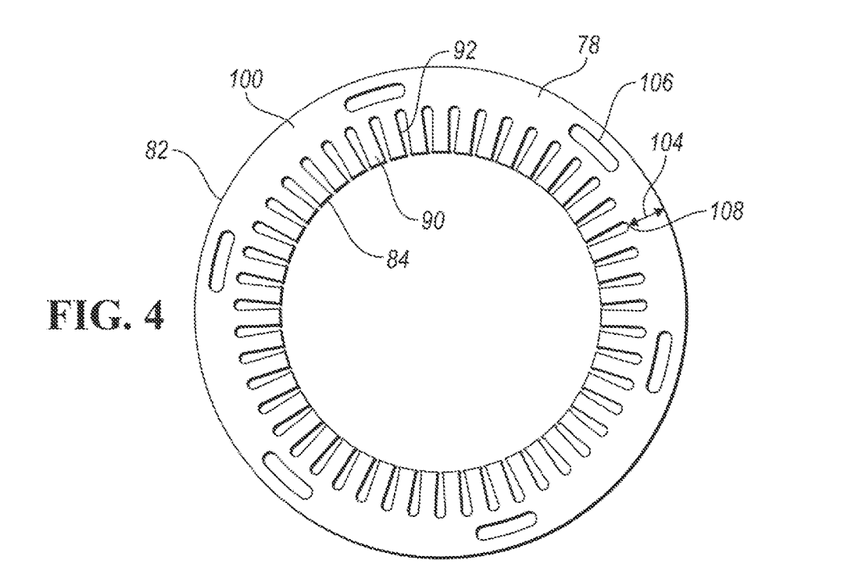
FIG. 4 is a top view of a lamination of the stator shown in FIG. 3.

Referring to FIGS. 2, 3, and 4 an example electric machine 70 includes a stator 74 having a plurality of laminations 78. Each of the laminations 78 includes a front side 100 and a back side. When stacked, the front and back sides are disposed against adjacent front and back sides to form a stator core 80. Each of the laminations 78 may be doughnut shaped and may define a hollow center. Each lamination 78 also includes an outer diameter 82 and an inner diameter 84. The outer diameters 82 cooperate to define an outer surface 86 of the stator core 80, and the inner diameters 84 cooperate to define an outer surface 87 that forms to wall of the cavity 88.

Each lamination 78 includes a plurality of teeth 90 extending radially inward toward the inner diameter 84. Adjacent teeth 90 cooperate to define slots 92. The teeth 90 and the slots 92 of each lamination 78 are aligned with adjacent laminations to define stator slots 94 extending through the stator core 80 between the opposing end faces 112. The end faces 112 define the opposing ends of the core 80 and are formed by the first and last laminations of the stator core 80. Each of the end faces 112 has a radial length 113 measured between the outer surface 86 and the inner surface 87. A plurality of windings (also known as coils, wires, or conductors) 96 are wrapped around the stator core 80 and are disposed within the stator slots 94. The windings 96 may be disposed in an insulating material (not shown). Portions of the windings 96 generally extend in an axial direction along the stator slots 94. At the end faces 112 of the stator core, the windings bend to extend circumferentially around the end faces 112 of the stator core 80 forming the end windings 98. While shown as having distributed windings, the windings could also be of the concentrated type.

A rotor 72 is disposed within the cavity 88. The rotor 72 is fixed to a shaft 76 that is operably connected to the gearbox. When current is supplied to the stator 74, a magnetic field is created causing the rotor 72 to spin within the stator 74 generating a torque that is supplied to the gearbox via one or more shafts.

Each of the laminations 78 may also include a yoke region 104 defined between the outer diameter 82 and a valley 108 of the slots 92. A plurality of fluid apertures 106 may be defined in the yoke region 104 of each of the laminations 78. The apertures 106 extend between the front side 100 and the backside providing a void completely through the lamination 78. The apertures 106 may be slots (as shown) or may be another shape. When stacked, the apertures 106 of each lamination 78 are aligned with adjacent laminations to define cooling channels 110 extending through the stator core 80 between the end faces 112. The example lamination 78 is shown to have six apertures, however, the present disclosure contemplates having greater or fewer than six apertures per lamination.

During operation, the electric machine 70 generates heat within the stator core 80 and the windings 96. To prevent overheating of the electric machine, a fluid circuit may be provide to remove heat generated during operation.

Figure 5:
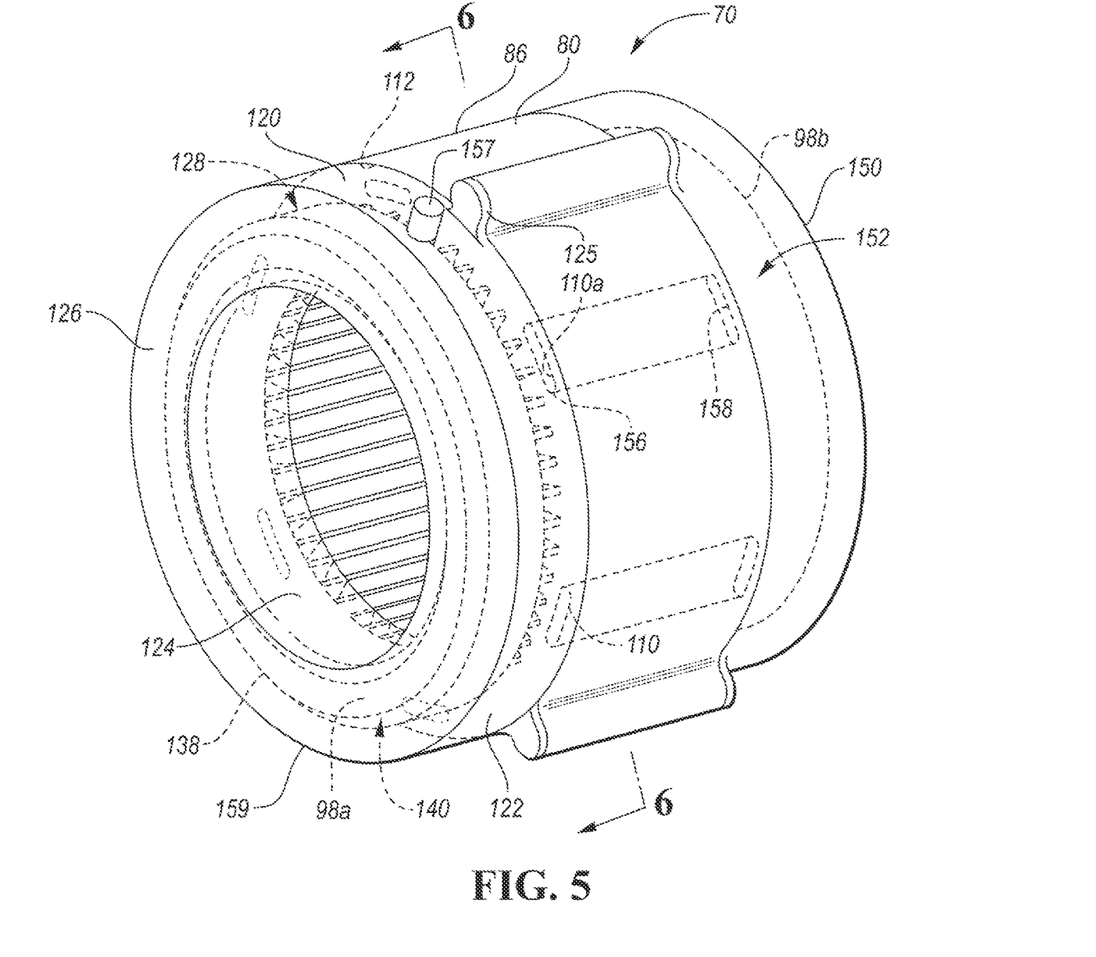
FIG. 5 is a front perspective view of an electric machine.
Figure 6:
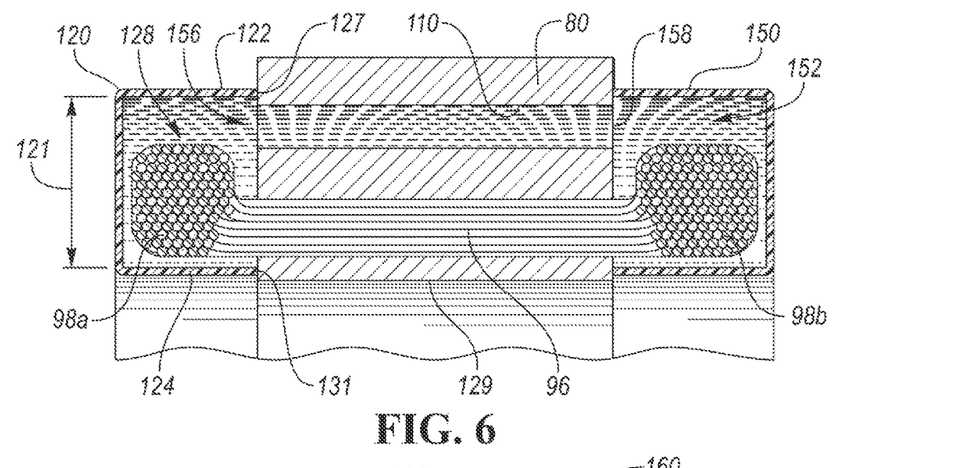
FIG. 6 is a side view, in cross section, of the electric machine along cut line 6-6.

Referring to FIGS. 5 and 6, the electric machine 70 may include a first annular cover 120 disposed over the lead-side end windings 98a. The cover defines an annular cooling chamber for cooling the end windings 98a (schematically shown as a solid ring) as will be described below in more detail. The cover 120 may include an outer circumferential wall 122, an inner circumferential wall 124, and an adjoining wall 126 connecting the inner and outer walls. The cover may be sized such that the outer wall 122 is near the outer surface 86 of the stator core 80, and the inner wall 124 is near the inner surface 87 of the stator core 80 when the cover 120 is installed on the end face 112 of the stator core 80. The cover may be sized such that a radial distance 121 between the inner and outer walls is less than or equal to a radial length 113 of the end face 112. This design minimizes the footprint of the covers. In this design, the inner wall does project past the inner surface 129 of the stator core 80. Thus, the gap between the stator and rotor does not have to be increases due to the covers as some prior art designs have done. Space within transmissions is limited, and minimizing the size of the electric machines is highly desirable. The cover 120 may be attached to the end face via a tab 125. When attached, the end surface 127 of outer wall and the end surface 131 of the inner wall are disposed against the end face 112.

The walls 122, 124, 126 cooperate to define an annular cooling cavity 128. The cavity 128 receives the end windings 98a therein. In some embodiments, the outer wall 122, the inner sidewall 124, and the adjoining wall 126 are integrally formed. In other embodiments, one or more of these components may be separate from the others.

The electric machine 70 also includes a second annular cover 150 disposed around the anti-lead-side end winding 98b. The second cover 150 may be similar to the first cover 120. For example, the second cover 150 defines an annular cooling cavity 152 that receives the end winding 98b therein. The covers 120, 150 may be made of plastic, composite, metal, or hardened resin (such as epoxy) as we described below in more detail.

The cooling cavity 128 (defined by the first cover 120) and the cooling cavity 152 (defined by the second cover 150) are connected in fluid communication via the fluid channels 110, which extend through the yoke region 104 of the stator core 80. Each of the fluid channels 110 includes a first port 156 that opens into the cavity 128 and a second port 158 that opens into the cavity 152. In the illustrated embodiment, port 156 is an inlet port and port 158 is an outlet port. Each of the cooling cavities 128, 152 are in direct fluid communication with at least one of the cooling channels 110. Direct fluid communication means that fluid immediately enters one of the components when exiting the other of the components, or vice versa. More illustratively, channel 110a is in direct fluid communication with cooling cavity 152 as fluid exiting through the port 158 of channel 110a immediately flows into the cooling cavity 150.

Figure 7:
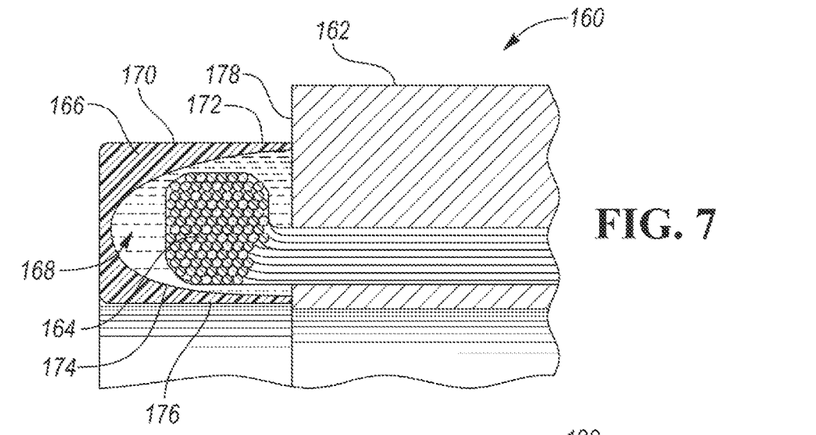
FIG. 7 is a side view, in cross section, of another electric machine.

Referring to FIG. 7, another electric machine 160 includes stator core 162 and end windings 164 projecting from the stator core. Electric machine 160 also includes a cover 166 that defines a cavity 168 disposed around the end windings 164. The cavity is configured to convey the cooling medium (such as oil) across the end windings 164 to cool them. In this embodiment, the cover 166 is formed of epoxy using an over-molding process. The epoxy cover 166 is a one-piece cover that includes an outer portion 170 having an outer most surface 172 and an inner portion 174 having an inner most surface 176. The distance between the outer most surface 172 and the inner most surface 176 is less than or equal to the radial length of the end face 178. In one example process, the epoxy over-molded cover is first formed by hardening wax around the end winding. The wax is sized and shaped to match the desired size and shape of the cavity. Next, the wax-covered end windings are dipped into an epoxy filled receptacle and left to cure either at room temperature or at an elevated temperature. The hardened epoxy adheres to the stator core 162 and forms the end cover 166. Lastly, the wax is melted to reveal the cavity 168.

Figure 8:
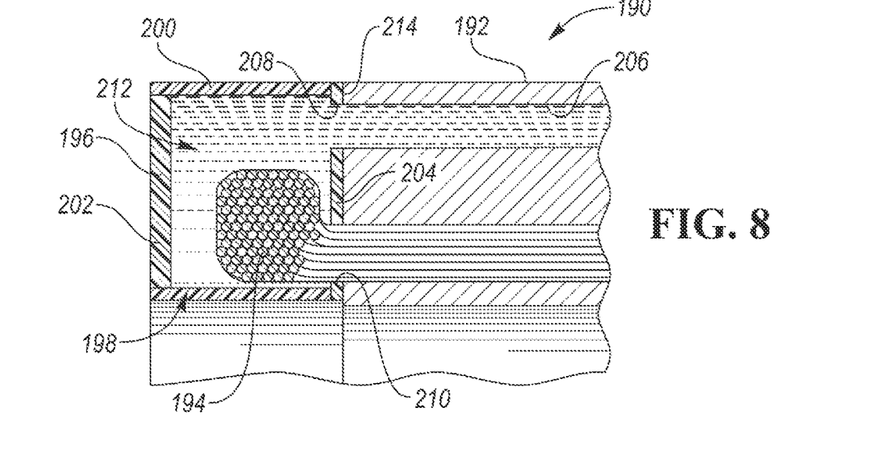
FIG. 8 is a side view, in cross section, of yet another electric machine.

Referring to FIG. 8, another electric machine 190 includes a stator core 192 and end windings 194 projecting from the stator core. The electric machine 190 also includes a cover 196 having spaced apart inner and outer walls 198, 200, and first and second vertical walls 202, 204 extending therebetween. The cover 196 is connected to the end face 214 of the stator core 192. The walls cooperate to define a cavity 212 that surrounds the end windings 194. The cavity is configured to convey a cooling medium (such as oil) across the end windings 194 to cool them.

The second vertical wall 204 may be an annular ring disposed against the end face 214. The wall 204 may define channel openings 208 that align with the cooling channels 206 extending through the stator core 192. The openings 208 allow fluid to flow from the channels 206 and into the cavity 212. The wall 204 may also include windings slots 210 that align with the stator slots allowing the windings to extend into the cavity 212. The cover 196 may have a two-piece construction in which the inner wall 198, the outer wall 200, and the first vertical wall 202 are integrally formed as a first piece, and the second wall 204 is formed as a second piece. With this design, the cover 196 may be assembled to the stator by first attaching the second wall 204 to the end face 214 and then assembling the first piece to the second piece. Example attachment means include snaps, fasteners or other means known by a person skilled in the art.

Depending upon the placement of the inlet and outlet ports, and the number of the ports, the coolant flow through the electric machine may have a plurality of different cooling path designs. For example, the cooling flow path could be in series or in parallel. The cooling flow path, depending upon the design, can either be gravity fed or forced-fed.

Figure 9:
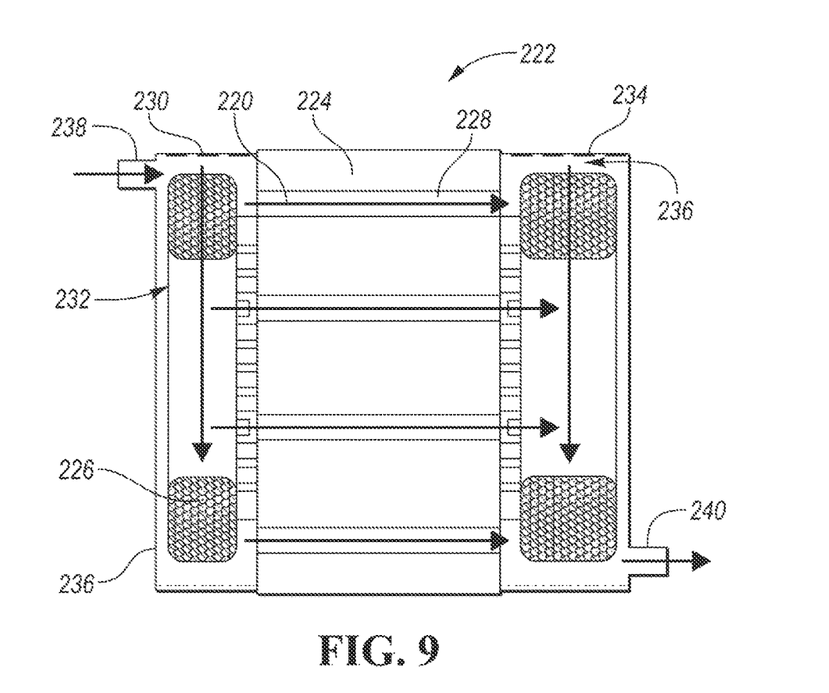
FIG. 9 is a diagrammatical view of an example series cooling flow path.

Referring to FIG. 9, an example parallel flow path 220 is illustrated on an example electric machine 222. The flow path 220 illustrates an example force-fed design. The electric machine 222 may include stator core 224, end windings 226, and the cooling channels 228 defined in the stator core. A first cover 230 has a first cavity 232, and is disposed on one of the end faces. A second cover 234 has a second cavity 236, and is disposed on the other of the end faces. The first and second cavities 232, 236 are connected in fluid communication via the cooling channels 228. The first cover 230 includes an inlet port 238 that connects with a supply conduit (such as a passageway defined in the transmission). The second cover 234 includes an outlet port 240 that either connects to a return conduit (such as a passageway defined in the transmission) or may simply allow oil to drain to the transmission sump. During operation, oil (or other dialectic fluid) is first supplied to the first cavity 232 via the inlet port 238. The oil flows downwardly across the end windings 226 and flows into the cooling channels 228. The oil flowing through the cooling channels 228 cools the stator core 224 as the oil flows from the first cover to the second cover. Once the oil reaches the second cavity 236, the oil flows across the end windings 226 to cool them. The oil then exits the electric machine via the outlet port 240.

Figure 10:
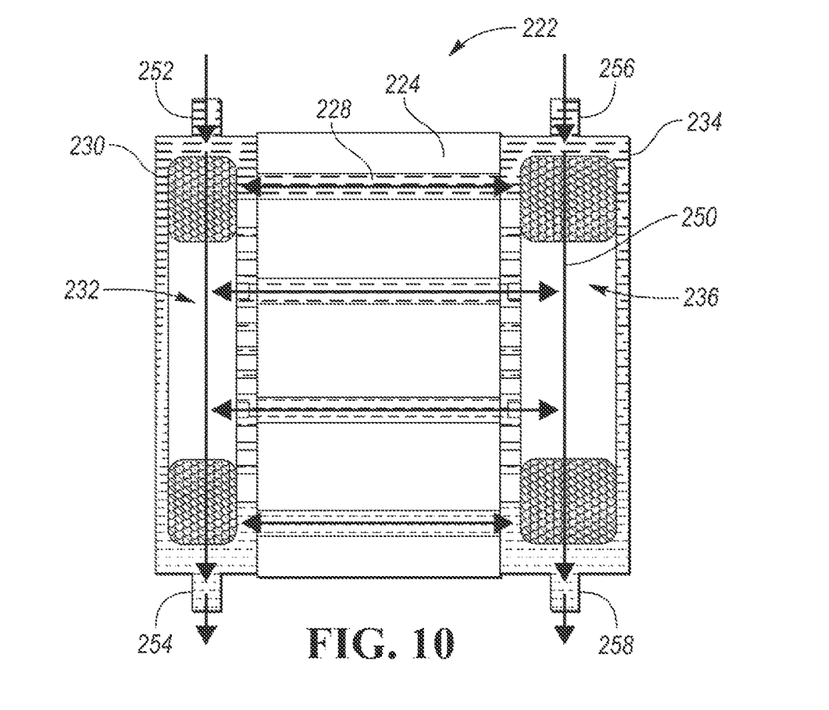
FIG. 10 is a diagrammatical view of an example parallel cooling flow path.

Referring to FIG. 10 another flow path 250 is illustrated on the example electric machine 222. The flow path 250 illustrates an example gravity-fed design. Here, each of the covers 230, 234 have an inlet port and an outlet port. For example, the first cover 230 includes an inlet port 252 and an outlet port 254, and the second cover 234 includes an inlet port 256 and an outlet port 258. A majority of the oil flows within the cooling cavities between the inlet port and the outlet port. But, some of the oil will flow through the cooling channels 228 to cool the stator core 224.

Figure 11A:
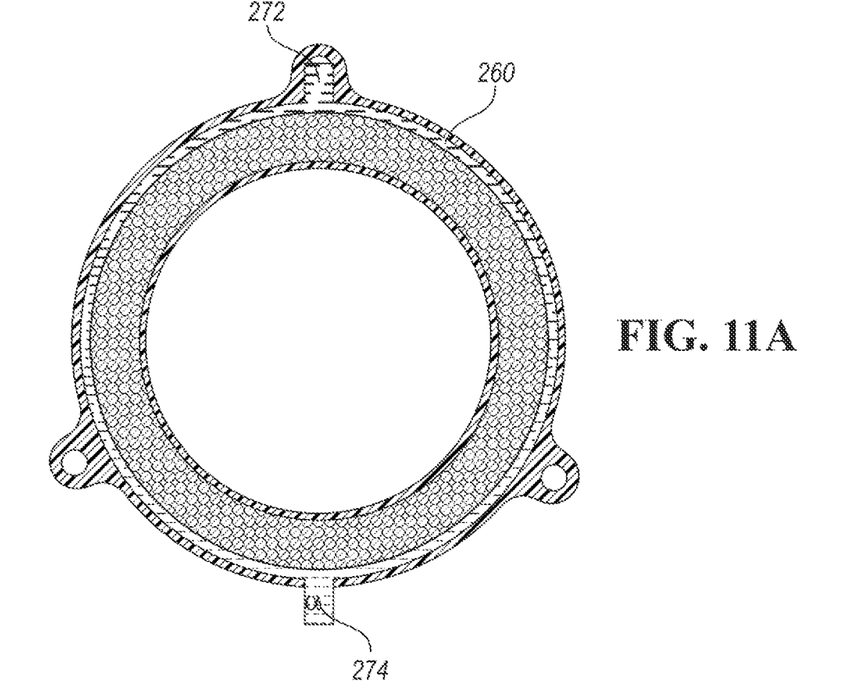
FIG. 11A is a front view of an example cover for a gravity-fed system.

The placement of the inlet and outlet ports for the covers may vary according to the design constraints. One constraint is whether the system is gravity fed or force-fed. Generally, a gravity fed system requires that the inlet port be located above the outlet port. FIG. 11A illustrates a cover 260 designed for a gravity fed system. The cover 260 may define an inlet port 272 located at the top of the cover 260, and an outlet port 274 located at a bottom of the cover. Positioning the inlet and outlet port 180 degrees apart, and at the upper and lower most portions of the cover, ensures that the entire end winding will receive oil. But, depending upon the cooling requirements, the location of the inlet port 272 and the outlet port 274 may be modified such that oil does not contact every portion of the end winding.

Figure 11B:
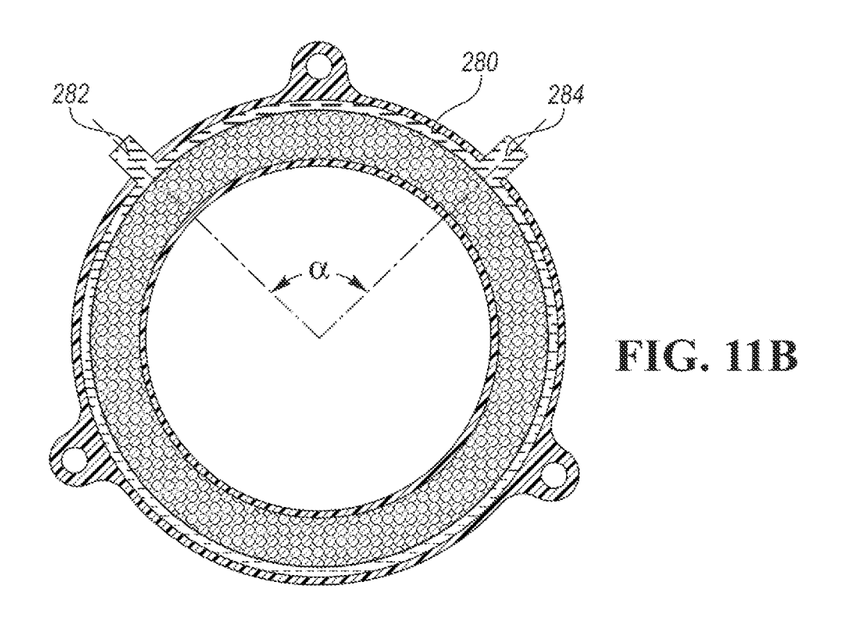
FIG. 11B is a front view of an example cover for a force-fed system.

FIG. 11B illustrates a cover 280 for a force-fed system. In a force-fed system the location of the ports is less critical as gravity is not required to drive the cooling medium. The cover 280 includes an inlet port 282 and an outlet port 284. In the illustrated embodiment, each of the ports is located on a side region of the cover. The angle (a) may range between 5 and 180 degrees. In one preferred embodiment, α is between 45 and 160 degrees. In the illustrated example, α is 95 degrees.

Figure 12:
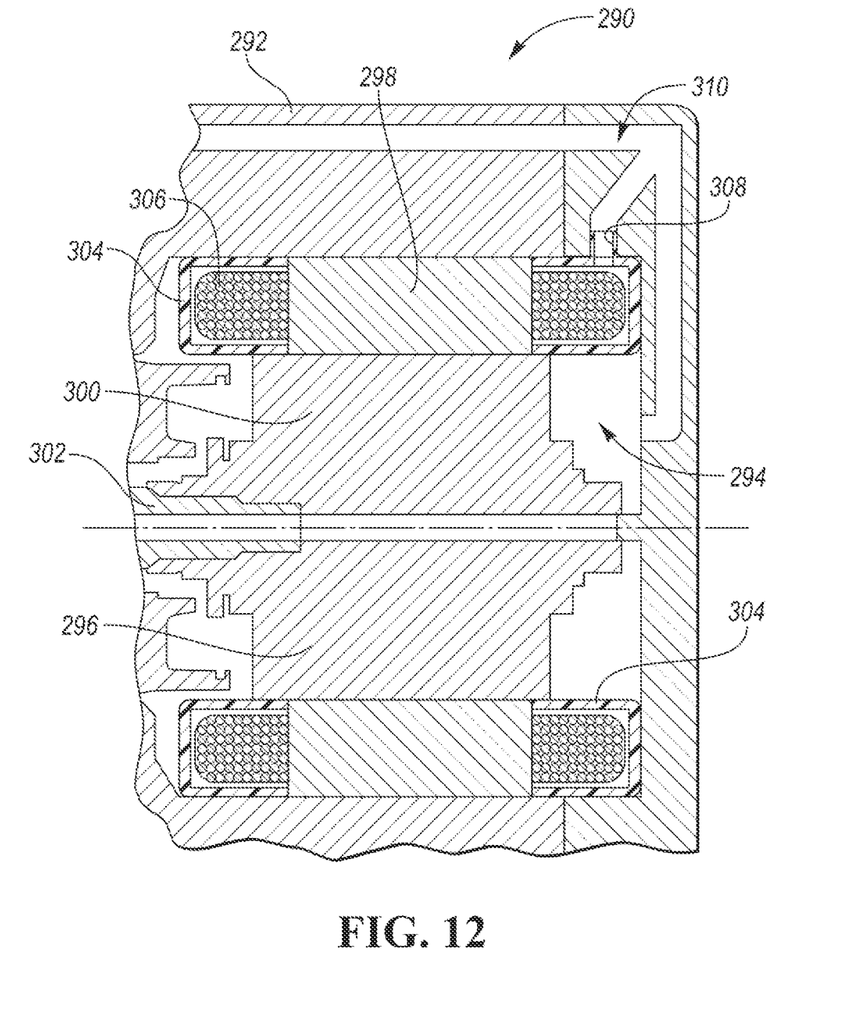
FIG. 12 is a side view, in cross section, of a portion of a transmission.

Referring to FIG. 12, an example hybrid transmission 290 is shown. The transmission 290 includes a housing 292 defining a cavity 294. An electric machine 296 (which may be the same or similar to electric machine 70) is supported within the cavity 294. The electric machine 296 includes a stator 298 that is mounted to the housing 292 such that the stator is unable to rotate relative to the housing 292. The rotor 300 is disposed within the stator and is fixed (e.g., splined) to a shaft 302. The shaft 302 may connect to the gear box. The electric machine includes a pair of annular covers 304 (same or similar to covers 120, 150) connected to the stator 298 to form cooling cavities around the end windings 306. At least one of the covers includes a port 308 that is in fluid communication with one or more passageways 310 defined in the housing 292. The passageways 310 may be in fluid communication with the valve body of the transmission 290 and are configured to convey oil to the cooling cavities to cooling the electric machine 296. The covers may also be in fluid communication with other passageways (not shown) to return oil to the valve body, or to convey oil to the sump.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle electric machine comprising:
a stator including an end face, a yoke region defining a fluid channel, and slots located radially inboard of the fluid channel;
windings extending through the slots and including end windings adjacent the end face; and
an annular cover including inner and outer walls defining an annular cavity that receives the end windings, wherein the fluid channel opens into the cavity and wherein a largest radial distance between the inner and outer walls is less than or equal to a radial length of the end face.

2. The vehicle electric machine of claim 1 wherein the stator includes a core having a plurality of stacked laminations each defining an aperture, and wherein the laminations are arranged such that the apertures align and cooperate to define the channel.

3. The vehicle electric machine of claim 1 wherein the yoke region defines a plurality of channels that each open into the cavity.

4. The vehicle electric machine of claim 1 wherein the annular cover further includes an inlet port and an outlet port, and wherein the angle between the ports is less than 160 degrees.

5. The vehicle electric machine of claim 1 wherein the cover further includes an end wall extending between the inner and outer walls, and wherein the end wall defines a port opening into the cavity.

6. The vehicle electric machine of claim 1 wherein the inner and outer walls of the cover are substantially parallel.

7. The vehicle electric machine of claim 1 wherein the stator further includes a second end face having a second end winding adjacent thereto, further comprising a second annular cover including inner and outer walls defining a second annular cavity configured to receive the second end winding, wherein the channel opens into the second cavity, and a radial distance between the inner and outer walls is less than or equal to a radial length of the second end face.

8. A vehicle electric machine comprising:
a stator core including an inner surface defining slots, an outer surface, opposing first and second end faces, and a yoke region defining a channel extending between the first and second end faces and including a first port defined by the first end face and a second port defined by the second end face;
windings configured to extend through the slots and including end windings adjacent the end faces;
a rotor disposed within a cavity defined by the inner surface; and
first and second annular covers each including an outer circumferential wall and an inner circumferential wall cooperating to define an annular cooling cavity configured to receive one of the end windings, wherein a radial distance between the inner and outer walls is less than or equal to a radial distance between the inner and outer surfaces, and wherein the first port opens into the cavity of the first cover and the second port opens into the cavity of the second cover to fluidly connect the annular cooling cavities.

9. The vehicle electric of claim 8 wherein the channel is a plurality of channels each extending through the yoke region and including a first port defined by the first end face and a second port defined by the second end face, and the channels are located radially outboard of the slots.

10. The vehicle electric machine of claim 9 wherein the first cover defines an inlet port and the second cover defines an outlet port, and wherein the ports, covers and channels cooperate to define a parallel cooling circuit configured to convey oil from the inlet port through the channels and out the outlet port.

11. The vehicle electric machine of claim 10 wherein the first and second annular covers each further includes first and second radially extending walls connecting between the inner and outer walls and axially spaced from each other so that the end windings are disposed between the first and second radially extending walls, the second wall being disposed against a corresponding one of the first and second end faces and defining winding slots that receive the windings and an opening aligned with the channel so that fluid may pass between the cavity and the channel.

12. The vehicle electric machine of claim 8 wherein the first cover further defines an inlet port and an outlet port.

13. The vehicle electric machine of claim 12 wherein the second cover further defines an inlet port and an outlet port.

14. The vehicle electric machine of claim 8 wherein the radial distance is a largest radial distance between the inner and outer walls.

15. A vehicle electric machine comprising:
a stator including inner and outer surfaces and an end face extending therebetween, and windings extending through slots; and
an annular cover including inner and outer circumferential walls and first and second radial walls connected between the circumferential walls to define a cavity configured to receive a portion of the windings, wherein the second wall is disposed against the end face and defines stator slots that receive the windings.

16. The vehicle electric machine of claim 15 wherein the stator defines channels each disposed between the slots and the outer surface, and including a port defined by the end face.

17. The vehicle electric machine of claim 15 wherein the stator further includes a second end face opposite the end face and extending between the inner and outer surfaces, further comprising a second annular cover disposed against the second end face and including inner and outer circumferential walls defining a cavity configured to receive a portion of the windings, wherein a radial distance between the inner and outer walls is less than or equal to a radial length of the second end face.

18. The vehicle electric machine of claim 15 wherein an end surface of each of the inner and outer circumferential walls is disposed against the end face.

19. A drivetrain comprising:
an electric machine disposed within a transmission housing and including
a stator including an end face, a yoke region defining a fluid channel, and slots located radially inboard of the fluid channel, and
an annular cover including inner and outer walls defining an annular cavity that receives the end windings, wherein the fluid channel opens into the cavity and wherein a largest radial distance between the inner and outer walls is less than or equal to a radial length of the end face.

20. The drivetrain of claim 19 wherein the annular cover further has an inlet port that is in fluid communication with a passageway at least partially defined by the transmission housing.

* * * * *